(12) United States Patent
Yoo (10) Patent No.: US 11,950,730 B2
(45) Date of Patent: Apr. 9, 2024

(54) SHOWER TOWEL SET EQUIPPED WITH HOLDER

(71) Applicant: BBTTO CORPORATION, Siheung-si (KR)

(72) Inventor: Jun Ho Yoo, Gunpo-si (KR)

(73) Assignee: BBTTO CORPORATION, Siheung-si (KR)

( * ) Notice: Subject to any disclaimer, the term of this patent is extended or adjusted under 35 U.S.C. 154(b) by 140 days.

(21) Appl. No.: 17/604,649

(22) PCT Filed: Apr. 16, 2020

(86) PCT No.: PCT/KR2020/005066
§ 371 (c)(1),
(2) Date: Oct. 18, 2021

(87) PCT Pub. No.: WO2020/213940
PCT Pub. Date: Oct. 22, 2020

(65) Prior Publication Data
US 2022/0211225 A1 Jul. 7, 2022

(30) Foreign Application Priority Data

Apr. 19, 2019 (KR) .................. 10-2019-0045986
Dec. 17, 2019 (KR) .................. 10-2019-0168774

(51) Int. Cl.
*A47K 7/02* (2006.01)
*A47K 10/14* (2006.01)

(52) U.S. Cl.
CPC ............... *A47K 10/14* (2013.01); *A47K 7/02* (2013.01)

(58) Field of Classification Search
CPC . A46B 5/04; A47K 7/02; A47K 7/022; A47K 7/024; A47K 7/026; A47K 7/028;
(Continued)

(56) References Cited

U.S. PATENT DOCUMENTS 1,418,019 A * 5/1922 Pearson ............... A47K 7/02
601/154
3,982,298 A * 9/1976 Ota ....................... A47L 23/10
2/167

(Continued)

FOREIGN PATENT DOCUMENTS

CN 205268005 U 6/2016
CN 108839919 A 11/2018
(Continued)

*Primary Examiner* — Joshua E Rodden
(74) *Attorney, Agent, or Firm* — Maschoff Brennan (57) ABSTRACT

A shower towel set includes a shower towel and a holder. The shower towel includes: an inlet provided on one side thereof such that a hand can be drawn in and out; a space portion; an upper pad portion, and includes first cleansing bristles formed outside the space portion, and first through holes perforated between the first cleansing bristles; and a lower pad portion, and includes second cleansing bristles formed outside the space portion, and second through holes, wherein a first partition protrusion is formed downward by a predetermined height, a second partition protrusion is provided upward by a predetermined height, and a space between the first partition protrusion and the second partition protrusion is open, wherein a wrist clamping member made of an elastic material is integrally formed with the inlet.

6 Claims, 11 Drawing Sheets

(58) Field of Classification Search
CPC . A47K 7/03; A47K 7/04; A47K 7/043; A47K 7/046; A47K 7/06; A47K 7/08; A47K 10/14; A47L 13/18; A47L 13/19
USPC .............................................. 211/45; 15/227
See application file for complete search history.

(56) References Cited

U.S. PATENT DOCUMENTS

| | | | | |
|---|---|---|---|---|
| 4,457,640 | A * | 7/1984 | Anderson | A47K 7/03 15/104.94 |
| 4,523,348 | A * | 6/1985 | Petrie | A47K 7/02 2/158 |
| 4,884,374 | A * | 12/1989 | Natale | A46B 5/04 451/523 |
| 4,980,943 | A * | 1/1991 | Barber | A47L 13/18 2/158 |
| 4,986,681 | A * | 1/1991 | Oliver | A47K 7/03 401/7 |
| 5,441,355 | A * | 8/1995 | Moore | A47K 7/03 401/7 |
| 5,682,837 | A * | 11/1997 | Courtney | A46B 5/04 119/664 |
| 7,234,170 | B2 * | 6/2007 | Simic | A41D 19/0058 2/161.6 |
| 10,959,579 | B1 * | 3/2021 | Sotos | A47K 7/02 |
| 11,129,513 | B2 * | 9/2021 | Mesiti | B32B 7/12 |
| 2003/0014824 | A1 * | 1/2003 | Farmer | A47K 7/02 15/118 |
| 2006/0191092 | A1 * | 8/2006 | O'Reilly | A47L 13/18 15/227 |
| 2020/0288918 | A1 * | 9/2020 | Lin | A47K 7/04 |
| 2021/0282603 | A1 * | 9/2021 | Lin | A47K 5/04 |

FOREIGN PATENT DOCUMENTS

| | | |
|---|---|---|
| JP | 3172570 U | 12/2011 |
| KR | 20-0342784 Y1 | 2/2004 |
| KR | 20-0452629 Y1 | 3/2011 |
| KR | 10-1105221 B1 | 1/2012 |
| KR | 20-0468730 Y1 | 8/2013 |
| KR | 20-0468936 Y1 | 9/2013 |

* cited by examiner

SHOWER TOWEL SET EQUIPPED WITH HOLDER

FIELD OF INVENTION

The present invention relates to a shower towel into which a user inserts his or her hand to wash the face and to shower when washing or showering and which is dried while being mounted on a holder before and after use, and a holder thereof, and more particularly to a shower towel set equipped with a holder for sufficiently and rapidly removing dirt via a simple shower in order to protect the skin from being easily injured due to bath habits that strongly remove dirt on the skin and for maintaining a clean condition by drying the shower towel by drying the shower towel while being mounted on the holder before and after use.

BACKGROUND OF INVENTION

In general, a so-called Italy towel is a bath product used to remove dirt attached to the body during bathing and is usually made of a rough cloth on both sides to remove dirt adhered to the stratum corneum of the skin through friction with the skin.

However, since the conventional scrubbing towel is made of a thin rough cloth on both sides, soap bubbles are not formed properly when soap is applied to the scrubbing towel, and thus consumption of soap increases and texture the scrubbing towel is not very suitable for soaping.

Although all of the conventional scrubbing towels are designed to be easily soaped, it is difficult to manufacture the towels due to the complicated structure thereof, which increases manufacturing costs.

In the conventional scrubbing towels, only a rough part of the cloth has a function of removing dirt from the skin, and in this regard, when children or women with weak skin try to remove dirt from the skin using these scrubbing towels, they experience pain in the skin or in severe cases, the stratum corneum of the skin peels off, causing scarring, and accordingly, there is a problem in avoiding use of the scrubbing towels.

That is, the conventionally manufactured scrubbing towel is a so-called "Italy towel", and when a user tries to remove dirt, even the epidermal tissue of the skin is peeled off, thereby damaging the skin and accelerating aging of the skin. An improved towel is developed by weaving toweling paper by applying high twist of single yarn to yarns used for standing threads, pipe threads, and weft threads, but is only to the extent of extending a service life by increasing only the strength of the yarn.

As described above, in order to solve the problem of causing skin damage when a scrubbing towel is used excessively, there has been a need for a product that replaces the scrubbing towel.

Accordingly, a scrubbing towel, which is a flexible fabric material that replaces the so-called Italy towel, has a soft feel when in contact with the skin and facilitates generation of a lot of foam, but there is a problem that the scrubbing towel is used for only a simple shower as it is difficult to remove dirt accumulated on the skin.

In addition, in order to reduce skin damage, soft cotton yarn, silk yarn, filament rayon yarn, etc. are formed in a pile on a towel surface, but this may be used for simple washing or moisture removal, and a scrubbing effect is disadvantageously not achieved.

In addition, since the existing shower towel or scrubbing towel is maintained and stored in a bathroom in a state in which moisture does not evaporate, bacteria are easily propagated on the towel, and there is a boiling method in boiling water to prevent such bacterial infection. However, it is not easy to disinfect towels every time, and thus the towels are usually disinfected once every few days or are used without disinfection at all.

Therefore, the currently used shower towel is formed of a material on which bacterial growth is essentially difficult to prevent, and thus in order to overcome the problem, it is required to develop a product that is formed of a silicone material, does not primarily propagate bacteria, and is easy to sterilize and disinfect secondarily.

SUMMARY OF INVENTION

Technical Problem to be Solved

The present invention has been made in view of the above problems as follows.

First, the present invention may include a separate space for temporarily storing soap or other shower detergents to continuously generate bubbles during showering.

Second, the present invention may improve the feel of grip of the shower towel to prevent the shower towel from being separated from the hand by separately positioning the user's fingers within the space.

Third, the shower towel may be easily dried before and after showering.

Fourth, the shower towel and the holder may be formed of a material prepared by mixing a silicone material and powders formed by pulverizing cockleshell, and thus antibacterial and sterilization effects may be achieved, thereby maintaining a clean condition at all times.

Fifth, compared with a conventional grid-pattern shower towel, anti-slip parts shaped like a fingerprint similar to that of the human body may be provided on an inner bottom of a lower pad of the shower towel, and ridges may be provided at a predetermined position corresponding to a recess of the palm and predetermined positions corresponding to second joints of the fingers, and accordingly, when the user uses the shower towel according to the present invention, the user's hand and the shower towel according to the present invention may be in close contact with each other and may not be separated by minimizing the conventional problem in terms of separation between the user's hand and the shower towel.

However, the objectives are exemplary, and do not limit the scope of the present invention.

Technical Solution

In accordance with the present invention, the above and other objects can be accomplished by the provision of a shower towel set equipped with a holder, including a shower tower and a holder.

A shower towel 1 may include an entrance 10 that is formed at one side thereof and allows the hand to be put therein and a space 10' that is provided inside the entrance 10 and accommodates the hand therein;

an upper pad 100 including first cleaning brushes 101 formed outside the space 10' while forming an upper side of the space 10' and first through holes 102 perforated between the first cleaning brushes 101; and a lower pad 110 including second cleaning brushes 111 formed outside the space 10' while forming a lower side of the space 10' and second through holes 112 perforated between the second cleaning brushes 111.

First division protrusions 103 may be formed downward by a predetermined height to separately accommodate the thumb and a central part at the other side of an internal surface of the upper pad 100.

Second division protrusions 113 may be formed upward by a predetermined height to separately accommodate the thumb and a central part at the other side of an internal surface of the lower pad 110.

A space between the first division protrusions 103 and the second division protrusions 113 may be opened.

A wrist tightening member 120 made of an elastic material may be integrally formed with the entrance 10 to allow the wrist to be closely attached to the shower towel 1, and the shower towel 1 may have a shape for separately accommodating a thumb and remaining fingers.

A holder 2 may be configured to hold the shower towel 1 before and after the shower towel 1 is used.

The holder 2 may include a bottom surface 20 and a mounting member formed upward integrally with the bottom surface formed upward integrally with the bottom surface 20.

The shower towel 1 and the holder 2 may be prepared by mixing 99 to 99.5% of silicone and 0.5 to 1% of cockleshell.

The cockleshell includes cockleshell formed by removing foreign substances from harvested cockleshell, cleaning, drying, and sterilizing a result, firing the result at 1200° C., and then pulverizing and powderizing the result.

The mounting member 200 of the holder 2 may be formed of like a plate in which a plurality of through holes 201 is perforated and may have a shape of a mitten to separately position the thumb and the remaining fingers.

The holder 2 may include a second bottom surface 21 that is vertically bent from one side of the bottom surface 20, and the mounting member 200 may be configured only by an edge part 210 shaped like a mitten to separately position the thumb and the remaining fingers.

Anti-slip parts 30 shaped like a fingerprint may be provided on an inner bottom of the lower pad 110, and ridges 31 may be provided at a predetermined position corresponding to a recess of a palm and predetermined positions corresponding to second joints of fingers.

Effect of Invention

According to the present invention as configured above.

A separate space for temporarily storing soap or other shower detergents may be provided to continuously generate bubbles during showering, and the feel of grip of the shower towel may be improved to prevent the shower towel from being separated from the hand by separately positioning the user's fingers within the space. Compared with a conventional grid-pattern shower towel, anti-slip parts shaped like a fingerprint similar to that of the human body may be provided on an inner bottom of a lower pad, and ridges may be provided at a predetermined position corresponding to a recess of the palm and predetermined positions corresponding to second joints of the fingers, and accordingly, when the user uses the shower towel, the user's hand and the shower towel may be in close contact with each other and may not be separated by minimizing separation between the user's hand and the shower towel. In addition, before and after a shower, the shower towel may be easily dried, and simultaneously the shower towel and the holder may be formed of a material prepared by mixing a silicone material and powders formed by pulverizing cockleshell, thereby achieving antibacterial and sterilization effects.

[Best Mode]

According to an exemplary embodiment of the present invention:

a shower towel set equipped with a holder includes a shower towel 1 including an entrance 10 that is formed at one side thereof and allows a hand to be put therein, a space 10' that is provided inside the entrance 10, an upper pad 100 including first cleaning brushes 101 formed outside the space 10' while forming an upper side of the space 10' and first through holes 102 perforated between the first cleaning brushes 101, a lower pad 110 including second cleaning brushes 111 formed outside the space 10' while forming a lower side of the space 10' and second through holes 112 perforated between the second cleaning brushes 111, first division protrusions 103 formed downward by a predetermined height to separately accommodate a thumb and a central part at a remaining side of an internal surface of the upper pad 100, and second division protrusions 113 are formed upward by a predetermined height to separately accommodate the thumb and a central part at the remaining side of an internal surface of the lower pad 110, a space between the first division protrusions 103 and the second division protrusions 113 being opened, and a wrist tightening member 120 made of an elastic material and integrally formed with the entrance 10, and the shower towel 1 having a shape for separately accommodating a thumb and remaining fingers, and a holder 2 configured to hold the shower towel 1 before and after the shower towel 1 is used and including a bottom surface 20, and a mounting member 200 formed upward integrally with the bottom surface 20.

MODE FOR INVENTION

Hereinafter, an exemplary embodiment of the present invention will be described in detail.

Figure 1:
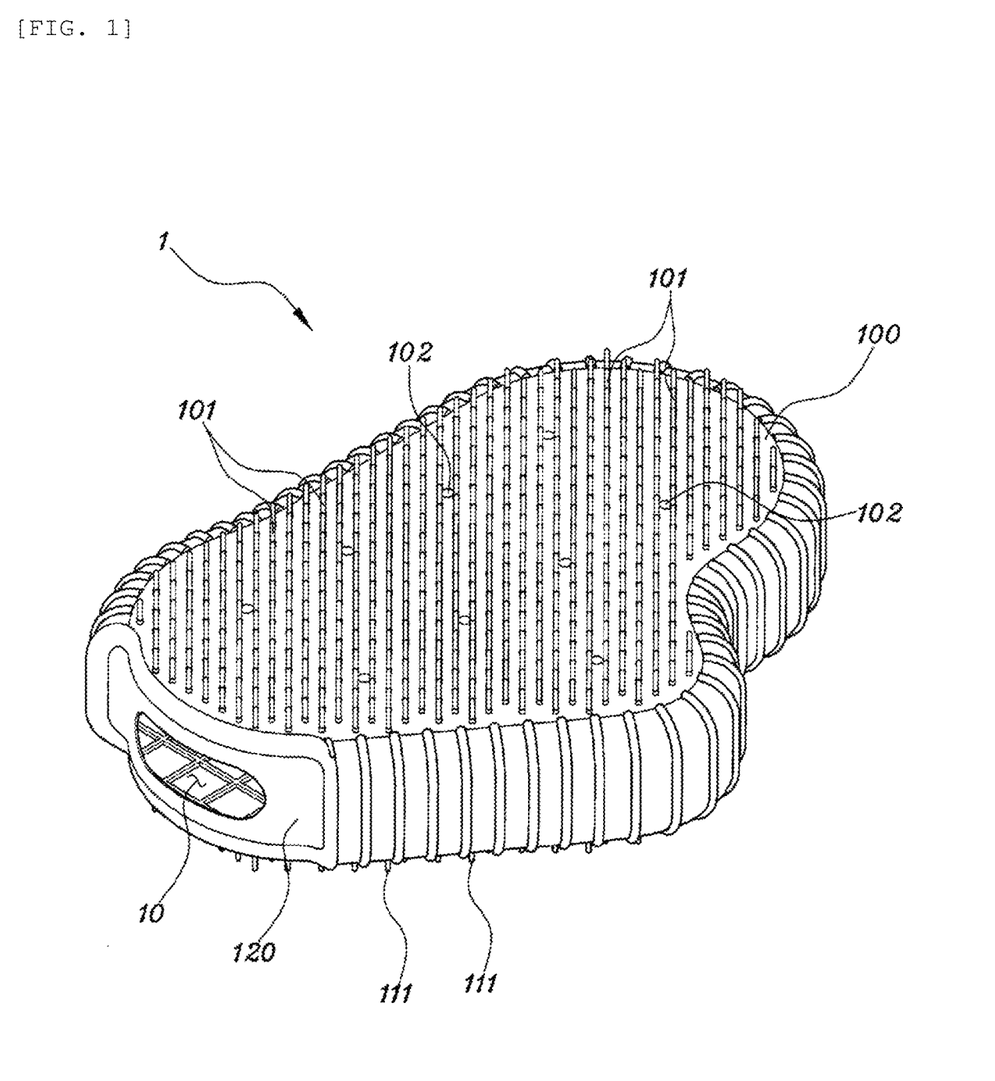
FIG. 1 is a perspective view of a shower towel of a shower towel set equipped with a holder according to the present invention.
Figure 2:
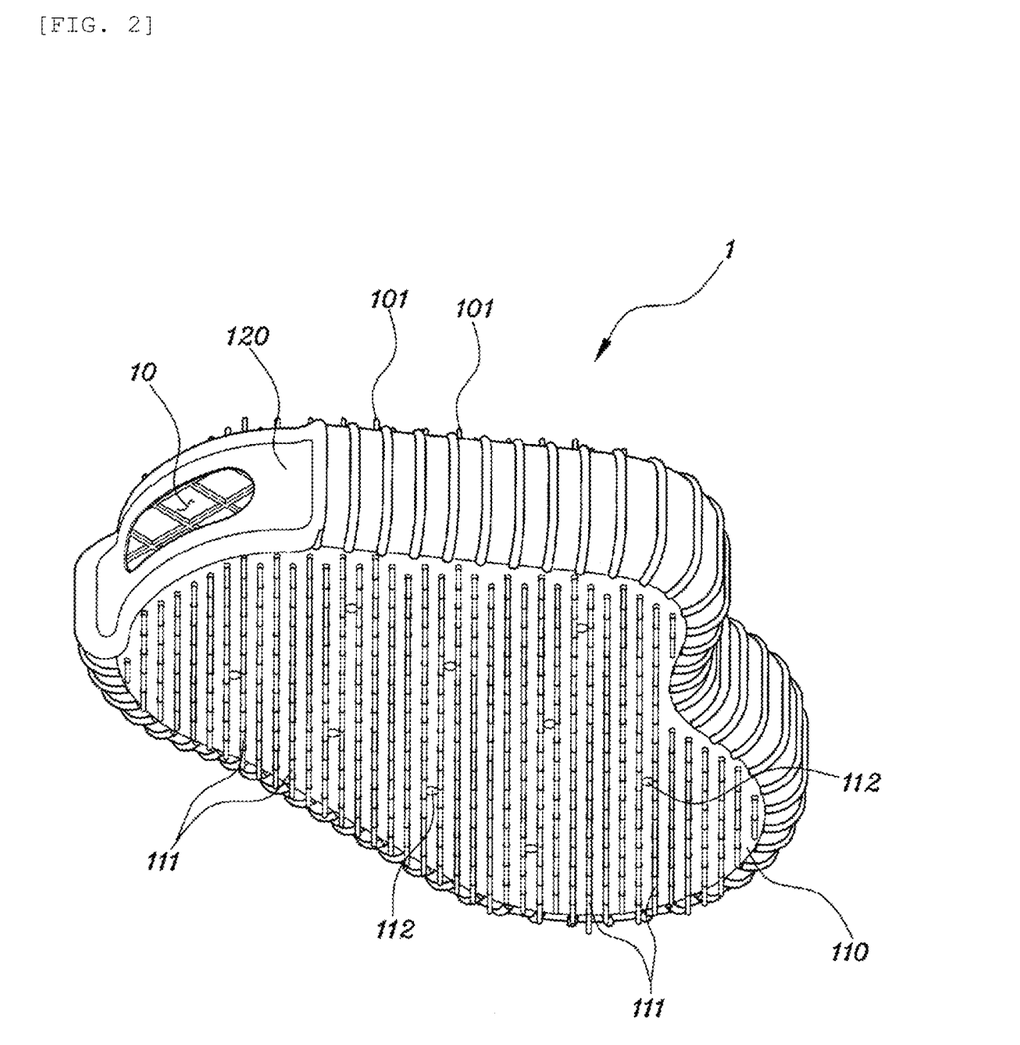
FIG. 2 is a bottom perspective view of a shower towel of a shower towel set equipped with a holder according to the present invention.

Reference numeral 1 is a shower towel, and as shown in FIGS. 1 and 2, the shower towel 1 has a shape of, for example, a so-called mitten to separately position the thumb and the remaining four fingers as a whole. First, the shower towel 1 may include an entrance 10 that is formed at one side thereof and allows the hand to be put therein and a space 10' that is provided inside the entrance 10 and accommodates the hand therein.

Figure 3:
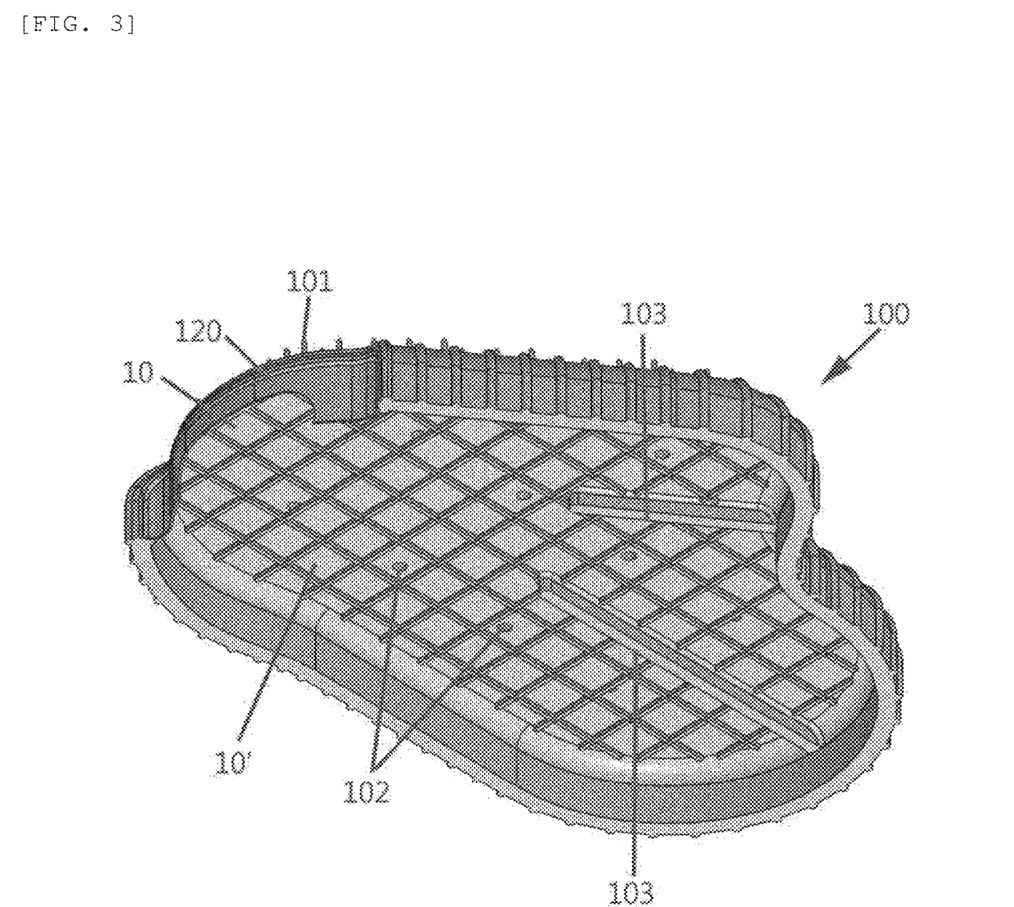
FIG. 3 is an internal perspective view of an upper pad of a shower towel set equipped with a holder according to the present invention.
Figure 4:
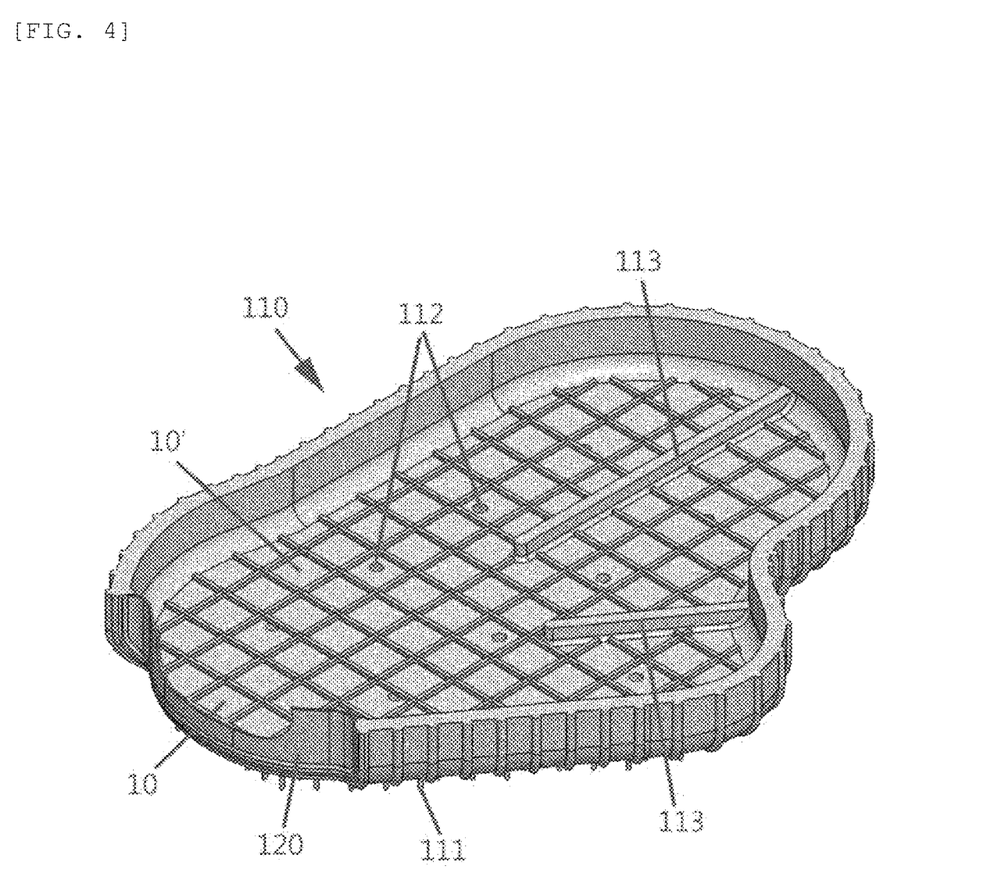
FIG. 4 is an internal perspective view of a lower pad of a shower towel set equipped with a holder according to the present invention.

As shown in FIG. 3, an upper pad 100 including first cleaning brushes 101 formed outside the space 10' while forming an upper side of the space 10' and first through holes 102 perforated between the first cleaning brushes 101; and as shown in FIG. 4, a lower pad 110 including second cleaning brushes 111 formed outside the space 10' while forming a lower side of the space 10' and second through holes 112 perforated between the second cleaning brushes 111 may be integrally configured.

Figure 10:
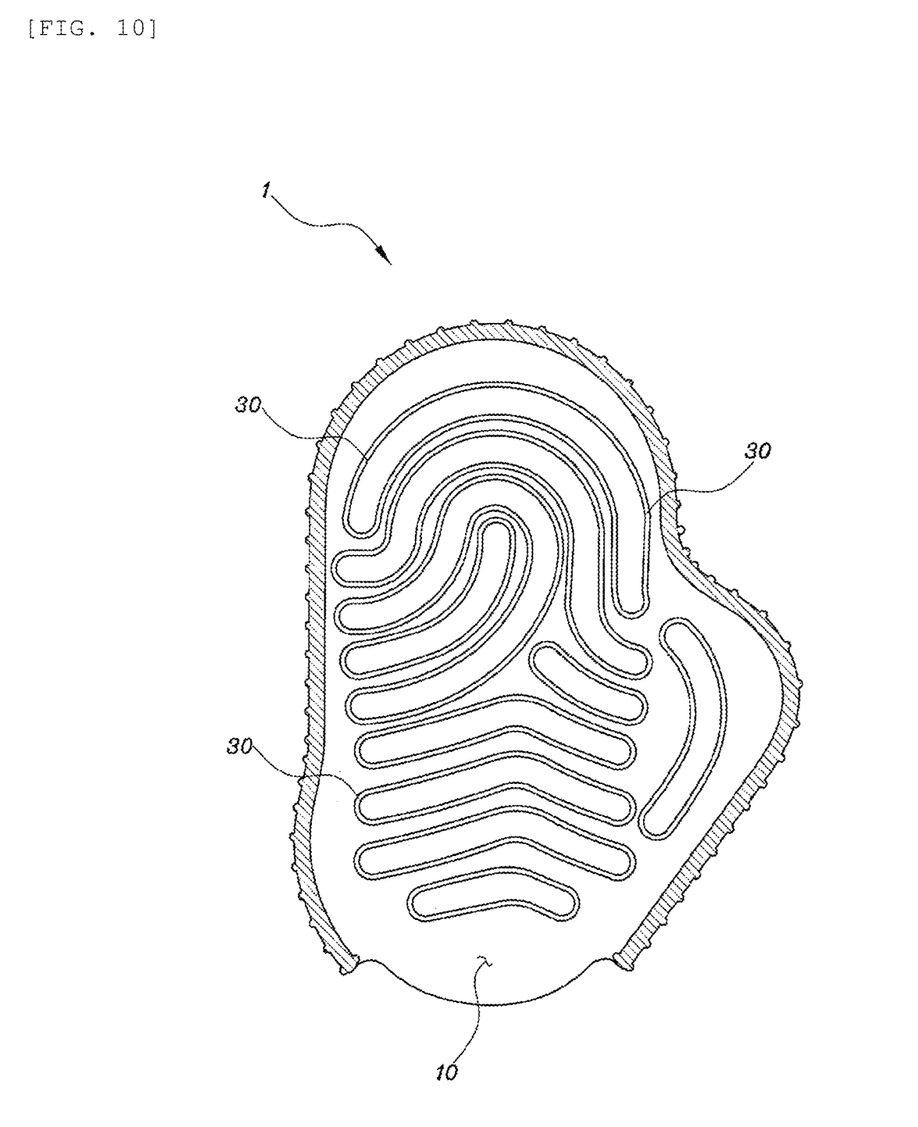
FIG. 10 is an internal plan view of an inner bottom of a lower pad of a shower towel set equipped with a holder according to the present invention.
Figure 11:
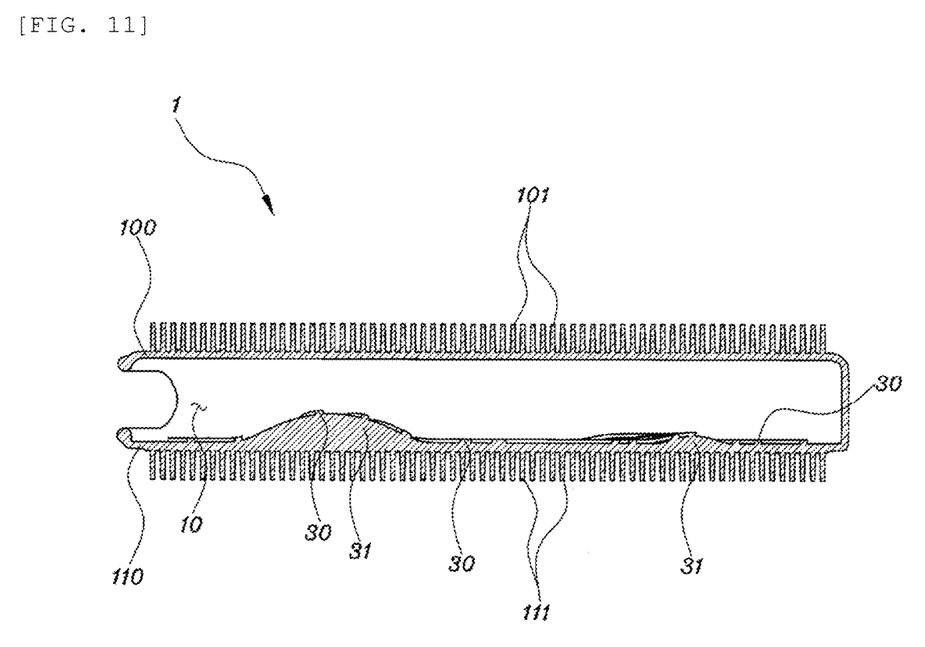
FIG. 11 is a cross-sectional view of an inner bottom of a lower pad of a shower towel set equipped with a holder according to another embodiment of the present invention.
Figure 12:
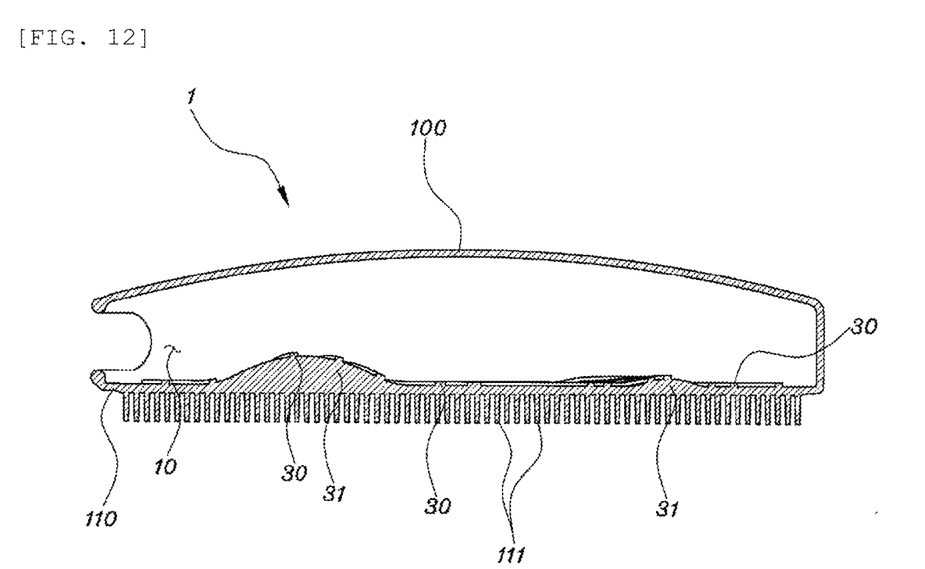

As shown in FIGS. 10 and 11, anti-slip parts 30 shaped like a fingerprint may be provided on an inner bottom of the lower pad 110, and ridges 31 may be provided at a predetermined position corresponding to a recess of the palm and predetermined positions corresponding to second joints of the fingers.

Figure 5:
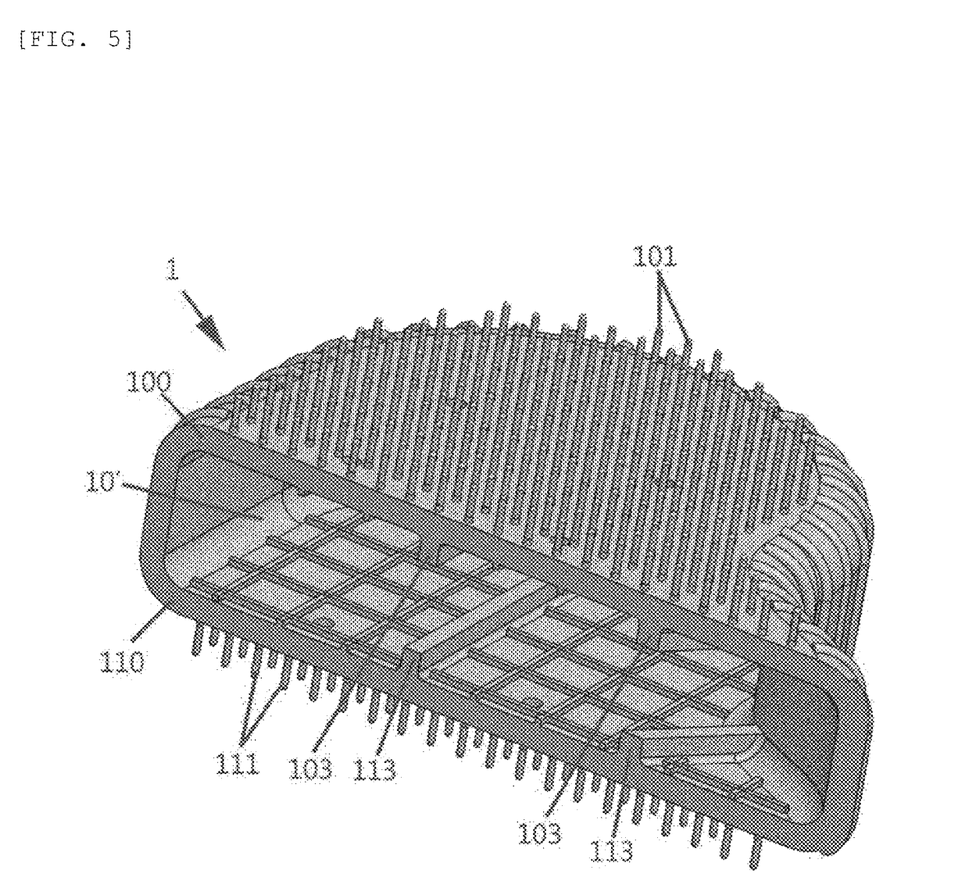
FIG. 5 is a partial exploded perspective view of a shower towel set equipped with a holder according to the present invention.

As shown in FIGS. 3 and 5, first division protrusions 103 may be formed downward by a predetermined height to separately accommodate the thumb and a central part at the other side of an internal surface of the upper pad 100.

As shown in FIGS. 4 and 5, second division protrusions 113 may be formed upward by a predetermined height to separately accommodate the thumb and a central part at the other side of an internal surface of the lower pad 110, and a space between the first division protrusions 103 and the second division protrusions 113 may be opened.

As shown in FIGS. 1 and 2, a wrist tightening member 120 made of an elastic material may be integrally formed with the entrance 10 to allow the wrist to be closely attached to the shower towel 1, and thus when the hand is pulled in and out of the shower towel 1, the hand may be easily pulled in and out of the shower towel 1 by elasticity of the wrist tightening member 120, and simultaneously, when the shower towel 1 is used after the hand is pulled in the shower towel 1, the wrist tightening member 120 may tightly fix the hand, and thus the hand may not be separated from the shower towel 1 to eliminate inconvenience in use.

Next, reference numeral 2 may be a holder, and the holder 2 may hold the shower towel 1 before and after the shower towel 1 is used.

The holder 2 may include a bottom surface 20, and a mounting member 200 that is formed upward integrally with the bottom surface 20.

In detail, the shower towel 1 and holder 2 may be prepared by mixing 99 to 99.5% of silicone and 0.5 to 1% of cockleshell, and in detail, the cockleshell may include cockleshell formed by removing foreign substances from harvested cockleshell, cleaning, drying, and sterilizing the result, firing the result at 1200° C., and then pulverizing and powderizing the result, and thus the antibacterial and sterilization properties of the shower towel 1 and the holder 2 may be improved to maintain a clean condition at all times.

Figure 9:
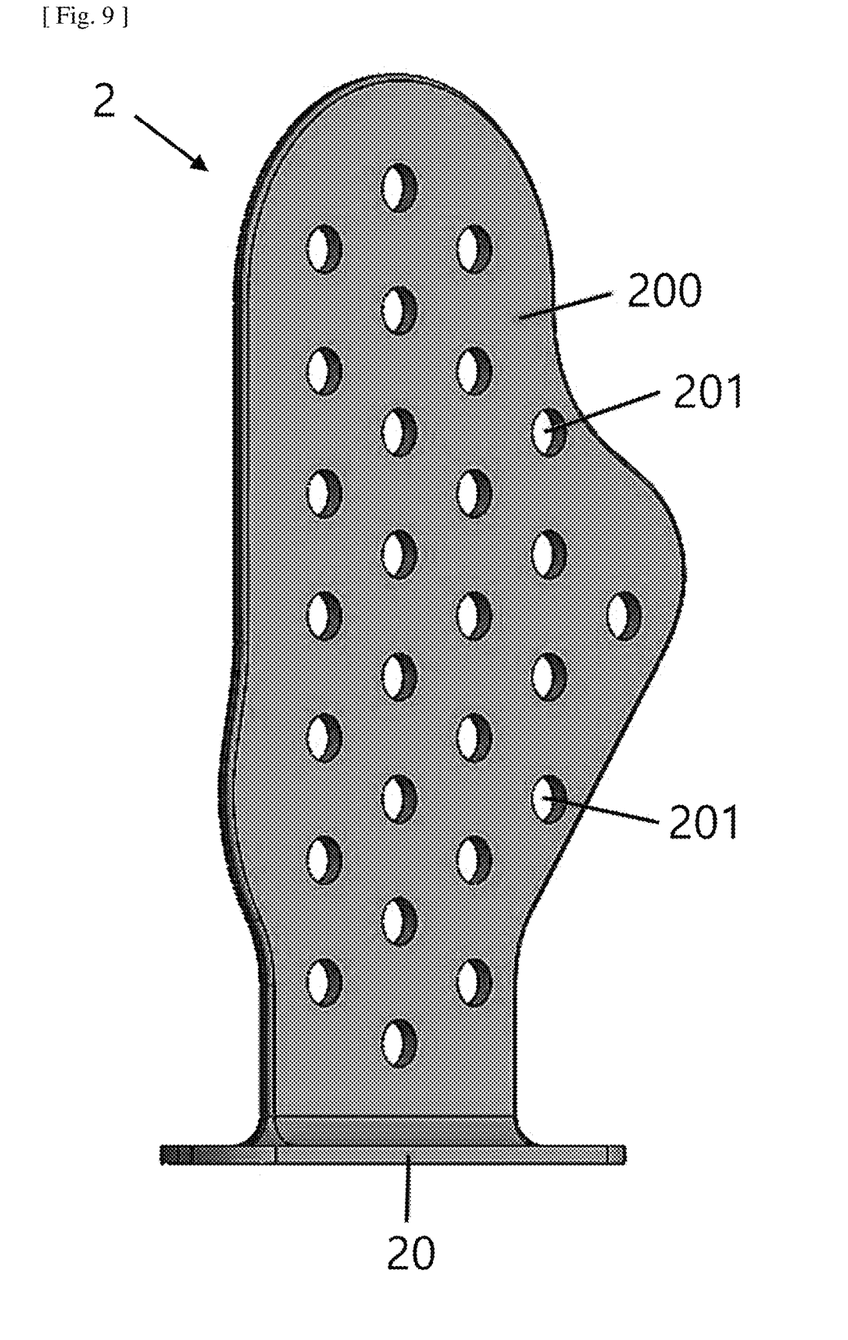
FIG. 9 is a perspective view of a holder of a shower towel set equipped with a holder according to another embodiment of the present invention.

As shown in FIG. 9, the mounting member 200 of the holder 2 may be formed like a plate in which a plurality of through holes 201 is perforated and may have a shape of a mitten to separately position the thumb and the remaining four fingers.

Figure 6:
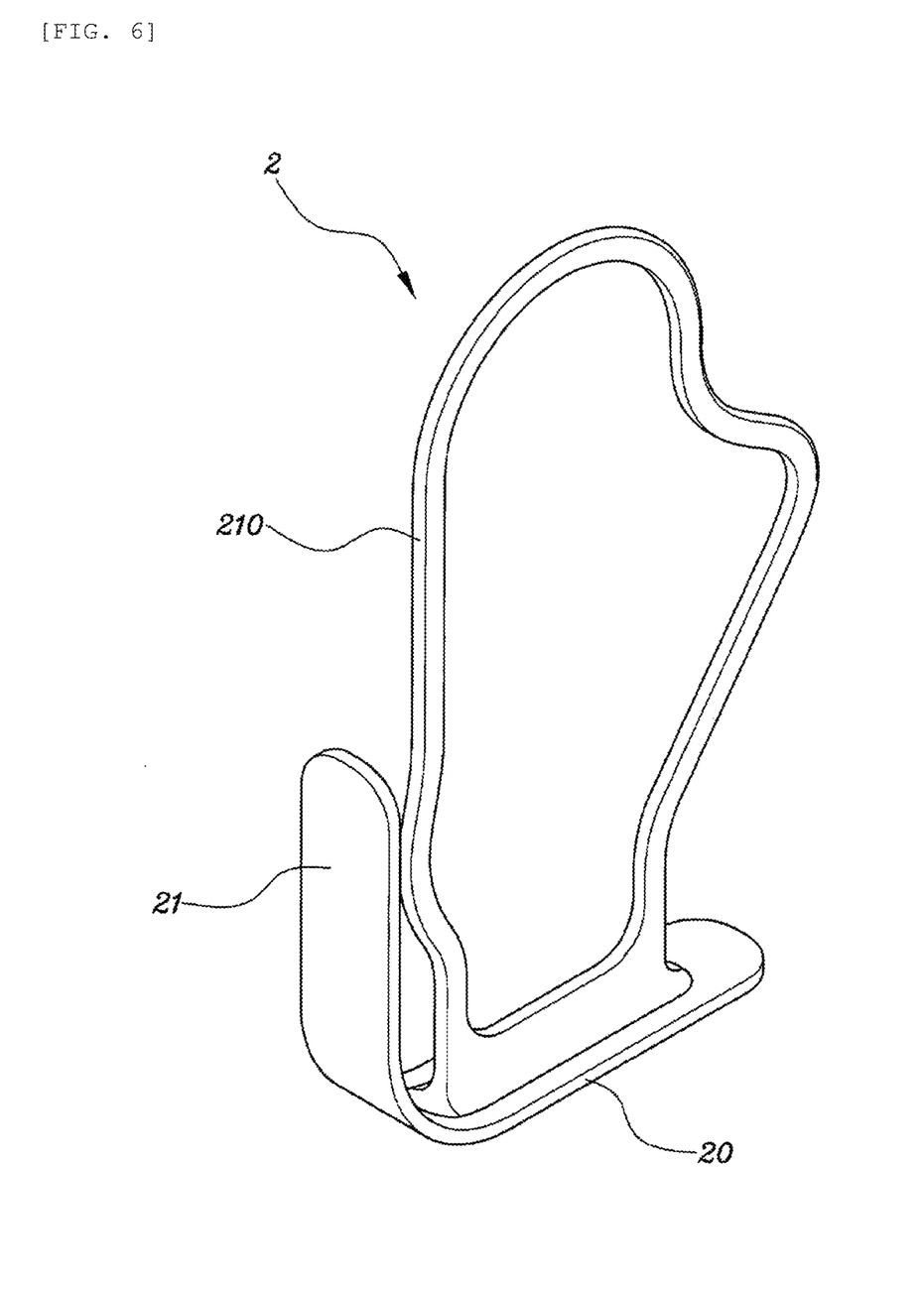
FIG. 6 is a perspective view of a holder of a shower towel set equipped with a holder according to an embodiment of the present invention.
Figure 7:
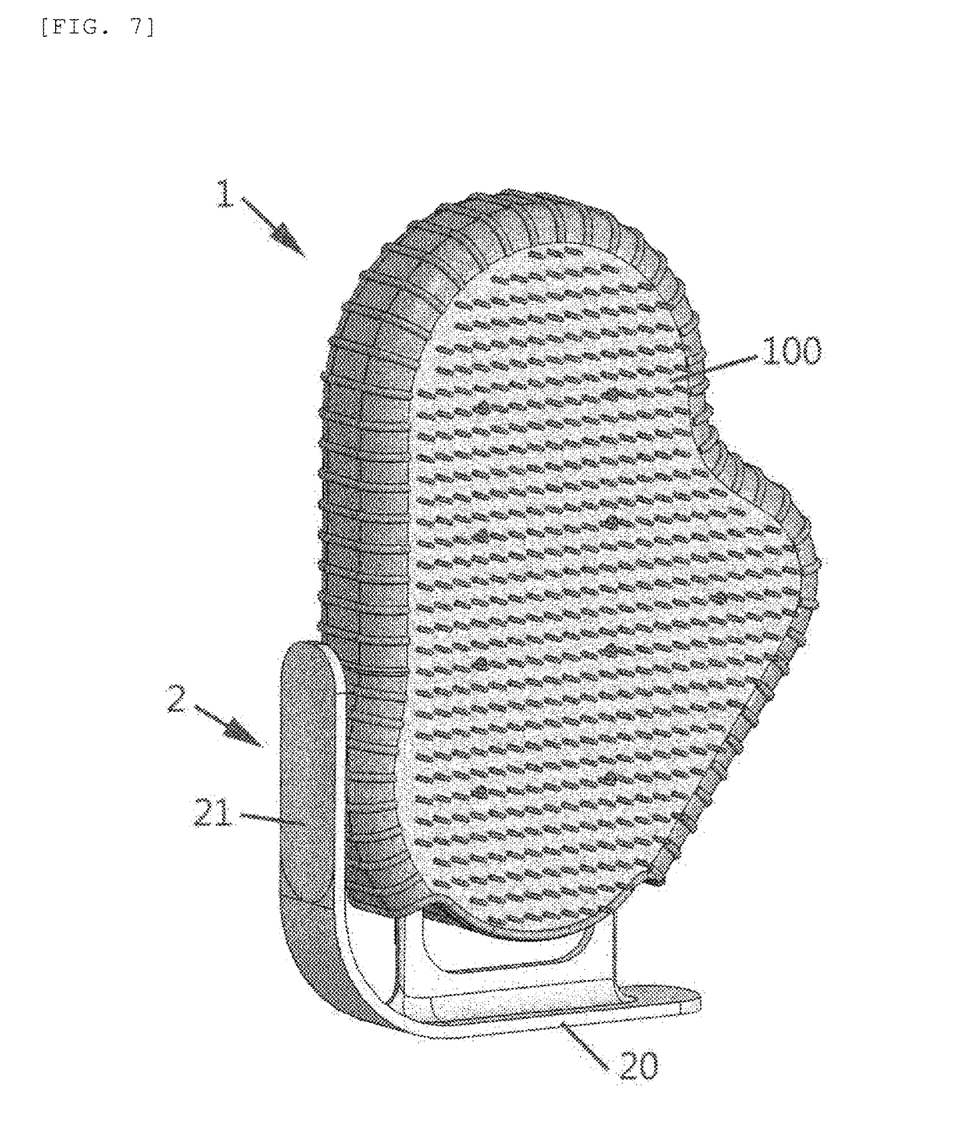
FIG. 7 is a perspective view showing the state in which a shower towel is mounted on the holder of FIG. 6 of a shower towel set equipped with a holder according to the present invention.
Figure 8:
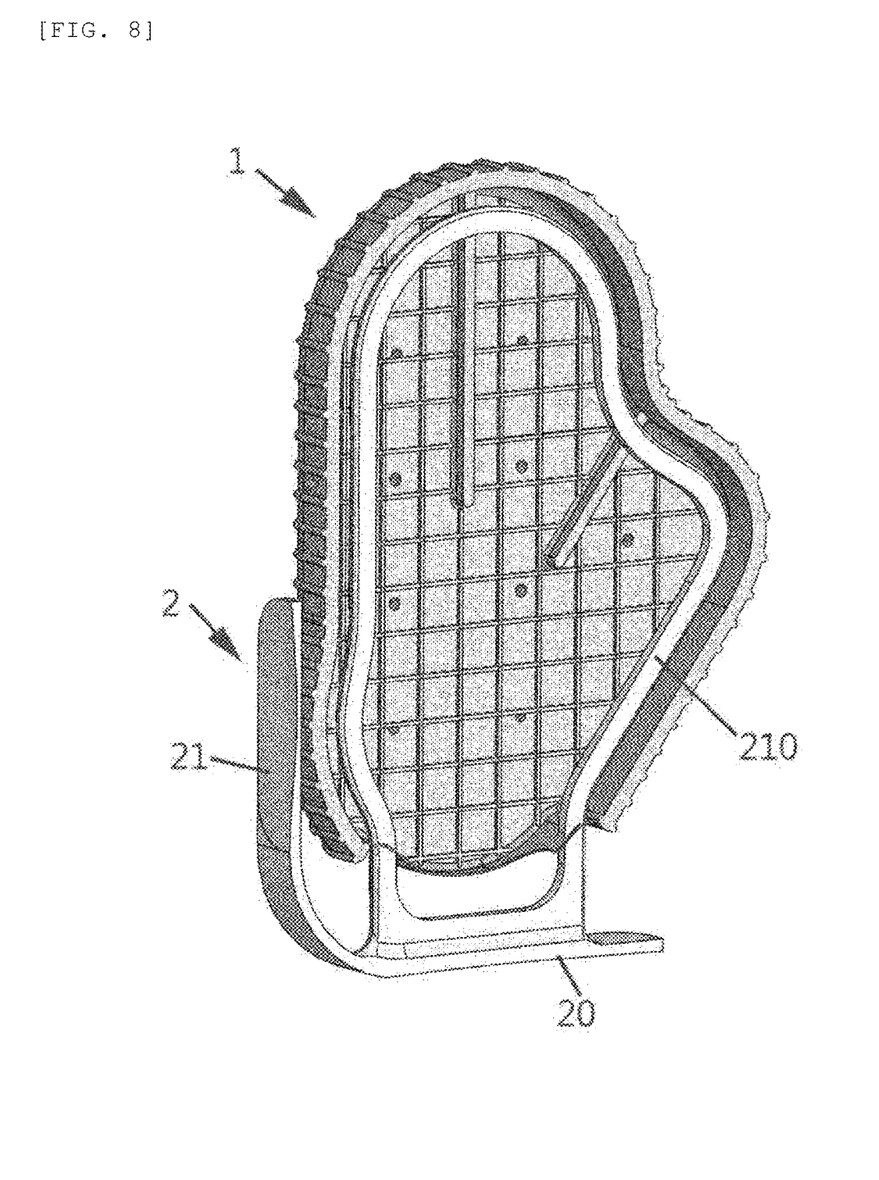
FIG. 8 is a cross-sectional view showing the state in which a shower towel is mounted on the holder of FIG. 6 of a shower towel set equipped with a holder according to the present invention.

In more detail, as shown in FIGS. 6 to 8, the holder 2 may include a second bottom surface 21 that is vertically bent from one side of the bottom surface 20, and the mounting member 200 may be configured only by an edge part 210 shaped like a mitten to separately position the thumb and the remaining four fingers to allow a user to accommodate the holder 2 in a desired form.

Hereinafter, an operation according to the present invention will be described.

First, in the state in which the shower towel 1 is mounted on the holder 2 and is dried before the shower towel 1 is used, in order to use the shower towel 1, when the user's hand is put in the entrance 10 and soap or shower detergent is dispensed and applied to the shower towel 1 to generate bubbles, the bubbles or moisture may smoothly flow through the first through holes 102 formed through the upper pad 100 and the second through holes 112 formed through the lower pad 110, and thus bubbles may be more smoothly generated. As such, after the bubbles are generated, the user's body may be cleaned using the first cleaning brushes 101 and the second cleaning brushes 111. In this regard, in terms of the first division protrusions 103 and the second division protrusions 113, after the user's thumb is positioned in an independent space, the index finger and the middle finger may be positioned at one side and the ring finger and the little finger may be positioned at the other side based on the first division protrusion 103 and the second division protrusion 113 which are provided at the center, and the space between the first division protrusions 103 and the second division protrusions 113 may be opened, thereby allowing detergent or soap to smoothly flow.

As such, in order to dry a shower towel after a shower, when the mounting member 200 is inserted into the space 10' and is accommodated and stored using the bottom surface 20, the holder 2 and the shower towel 1 may be sterilized by their own antibacterial and sterilizing properties, and simultaneously air may flow through the through holes 201 to smoothly dry the holder 2 and the shower towel 1, and in more detail, the mounting member 200 configured only by the edge part 210 may be inserted into the space 10', thereby allowing air to more smoothly flow.

As shown in FIGS. 10 and 11, compared with a conventional grid-pattern shower towel, the anti-slip parts 30 shaped like a fingerprint similar to that of the human body may be provided on an inner bottom surface of the lower pad 110 of the shower towel, and the ridges 31 may be provided at a predetermined position corresponding to a recess of the palm and predetermined positions corresponding to second joints of the fingers, and accordingly, when the user uses the shower towel according to the present invention, the user's hand and the shower towel according to the present invention may be in close contact with each other and may not be separated by minimizing the conventional problem in terms of separation between the user's hand and the shower towel.

The present invention as configured above may include a separate space for temporarily storing soap or other shower detergents to continuously generate bubbles during showering and may improve the feel of grip of the shower towel to prevent the shower towel from being separated from the hand by separately positioning the user's fingers within the space. Compared with a conventional grid-pattern shower towel, the anti-slip parts 30 shaped like a fingerprint similar to that of the human body may be provided on an inner bottom of the lower pad 110, and the ridges 31 may be provided at a predetermined position corresponding to a recess of the palm and predetermined positions corresponding to second joints of the fingers, and accordingly, when the user uses the shower towel according to the present invention, the user's hand and the shower towel according to the present invention may be in close contact with each other and may not be separated by minimizing separation between the user's hand and the shower towel 1. In addition, before and after a shower, the shower towel may be easily dried, and simultaneously the shower towel and the holder may be formed of a material prepared by mixing a silicone material and powders formed by pulverizing cockleshell, thereby achieving antibacterial and sterilization effects.

INDUSTRIAL AVAILABILITY

The present invention relates to a shower towel and a holder thereof, and more particularly to a shower towel into which a user inserts his or her hand to wash the face and to shower when washing or showering and which is dried while being mounted on a holder before and after use.

The invention claimed is:

1. A shower towel set equipped with a holder, comprising: a shower towel (1) including: an entrance (10) that is formed at one side thereof and allows a hand to be put therein; a space (10') that is provided inside the entrance (10); an upper pad (100) including first cleaning brushes (101) formed outside the space (10') while forming an upper side of the space (10') and first through holes (102) perforated between the first cleaning brushes (101); a lower pad (110) including second cleaning brushes (111) formed outside the space (10') while forming a lower side of the space (10') and second through holes (112) perforated between the second cleaning brushes (111); first division protrusions (103) formed downward by a predetermined height to separately accommodate a thumb and a central part at a remaining side of an internal surface of the upper pad (100), and second division protrusions (113) are formed upward by a predetermined height to separately accommodate the thumb and a central part at the remaining side of an internal surface of the lower pad (110), a space between the first division protrusions (103) and the second division protrusions (113) being opened; and a wrist tightening member (120) made of an elastic material and integrally formed with the entrance (10), the shower towel (1) having a shape for separately accommodating a thumb and remaining fingers; and a holder (2) configured to hold the shower towel (1) before and after the shower towel (1) is used and including: a bottom surface (20); and a mounting member (200) formed upward integrally with the bottom surface (20).

2. The shower towel set according to claim 1, wherein the shower towel (1) and the holder (2) are prepared by mixing 99 to 99.5% of silicone and 0.5 to 1% of cockleshell.

3. The shower towel set according to claim 2, wherein the cockleshell includes cockleshell formed by removing foreign substances from harvested cockleshell, cleaning, drying, and sterilizing a result, firing the result at 1200° C., and then pulverizing and powderizing the result.

4. The shower towel set according to claim 1, wherein the mounting member (200) of the holder (2) is formed of like a plate in which a plurality of through holes (201) is perforated and has a shape of a mitten to separately position the shape for separately accommodating the thumb and the remaining fingers.

5. The shower towel set according to claim 1, wherein the holder (2) includes a second bottom surface (21) that is vertically bent from one side of the bottom surface (20), and the mounting member (200) is configured only by an edge part (210) shaped like a mitten to separately position the shape for separately accommodating the thumb and the remaining fingers.

6. The shower towel set according to claim 1, wherein anti-slip parts (30) shaped like a fingerprint is provided on an inner bottom of the lower pad (110), and ridges (31) are provided at a predetermined position corresponding to a recess of a palm and predetermined positions corresponding to second joints of fingers.

* * * * *